United States Patent
Georgin et al.

(10) Patent No.: US 10,124,782 B2
(45) Date of Patent: Nov. 13, 2018

(54) BRAKE COOLING ESTIMATION METHODS AND SYSTEMS

(71) Applicant: Goodrich Corporation, Charlotte, NC (US)

(72) Inventors: Marc Jean Claude Georgin, Dayton, OH (US); Todd Rook, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 53 days.

(21) Appl. No.: 15/651,700

(22) Filed: Jul. 17, 2017

(65) Prior Publication Data

US 2017/0313295 A1 Nov. 2, 2017

Related U.S. Application Data

(62) Division of application No. 14/603,052, filed on Jan. 22, 2015, now Pat. No. 9,738,264.

(51) Int. Cl.
*B60T 17/22* (2006.01)
*G07C 5/08* (2006.01)
(Continued)

(52) U.S. Cl.
CPC ............... *B60T 17/22* (2013.01); *B60T 5/00* (2013.01); *B60T 17/221* (2013.01);
(Continued)

(58) Field of Classification Search
None
See application file for complete search history.

(56) References Cited

U.S. PATENT DOCUMENTS 9,738,264 B2  8/2017  Georgin et al.
2004/0130211 A1*  7/2004  Fagergren ............. B60T 17/221
                                                        303/191
(Continued)

FOREIGN PATENT DOCUMENTS

DE         10259529         7/2004
DE      102005045488        4/2006
(Continued)

OTHER PUBLICATIONS

Extended European Search Report dated Jun. 21, 2016 in European Application No. 16152179.4.
(Continued)

*Primary Examiner* — David P. Merlino
(74) *Attorney, Agent, or Firm* — Snell & Wilmer L.L.P.

(57) ABSTRACT

Methods for estimating the cooling time of a brake assembly are disclosed. Methods are provided comprising receiving, by the processor, a first temperature of a brake assembly at a first time, receiving, by the processor, a second temperature of a brake assembly at a second time, wherein the second time occurs a fixed period after the first time, determining, by the processor, a temperature decay coefficient ("α") of the brake assembly based on the first temperature and the second temperature and calculating, by the processor, an estimated total time to cool the brake assembly to a predetermined temperature based on the first temperature, the predetermined temperature and α.

7 Claims, 3 Drawing Sheets

(51) Int. Cl.
*G01K 13/08* (2006.01)
*B60T 5/00* (2006.01)
*F16D 65/78* (2006.01)
*F16D 65/12* (2006.01)
*F16D 66/02* (2006.01)
*F16D 66/00* (2006.01)

(52) U.S. Cl.
CPC ........... *F16D 65/128* (2013.01); *F16D 65/78* (2013.01); *F16D 66/02* (2013.01); *G01K 13/08* (2013.01); *G07C 5/0808* (2013.01); *F16D 2065/783* (2013.01); *F16D 2066/001* (2013.01)

(56) References Cited

U.S. PATENT DOCUMENTS

| | | | | |
|---|---|---|---|---|
| 2006/0241819 | A1* | 10/2006 | Greene | B60T 8/00 |
| | | | | 701/3 |
| 2009/0125286 | A1 | 5/2009 | Waltz | |
| 2010/0286880 | A1* | 11/2010 | Cahill | B60T 17/221 |
| | | | | 701/70 |
| 2014/0269824 | A1* | 9/2014 | Miller | F16D 66/00 |
| | | | | 374/104 |
| 2016/0214593 | A1 | 7/2016 | Georgin et al. | |
| 2017/0072932 | A1* | 3/2017 | Steward | B60T 17/221 |

FOREIGN PATENT DOCUMENTS

| | | |
|---|---|---|
| EP | 1950111 | 7/2008 |
| EP | 2743534 | 6/2014 |
| FR | 2964928 | 3/2012 |
| GB | 2289765 | 11/1995 |

OTHER PUBLICATIONS

USPTO; Restriction Requirement Office Action dated Jul. 7, 2016 in U.S. Appl. No. 14/603,052.
USPTO; Pre-Interview First Office Action dated Nov. 17, 2016 in U.S. Appl. No. 14/603,052.
USPTO; First Action Interview Office Action dated Jan. 3, 2017 in U.S. Appl. No. 14/603,052.
USPTO; Notice of Allowance dated Apr. 18, 2017 in U.S. Appl. No. 14/603,052.

* cited by examiner

BRAKE COOLING ESTIMATION METHODS AND SYSTEMS

CROSS REFERENCE TO RELATED APPLICATIONS

This application is a divisional of, and claims priority to, and the benefit of U.S. patent application Ser. No. 14/603,052, filed on Jan. 22, 2015, and entitled "BRAKE COOLING ESTIMATION METHODS AND SYSTEMS" which is incorporated by reference herein in its entirety.

FIELD

The present disclosure relates to methods and systems for the estimation of a cooling time for brakes.

BACKGROUND

During brake use, such as during an aircraft landing, brakes convert kinetic energy of a moving vehicle into, among other things, thermal energy. Brake temperatures thus rise during braking. In aircraft brakes, brakes may reach high temperatures (e.g. well above 1,000° F.). After a landing or other use of aircraft brakes, it is preferable to allow the aircraft brake temperature to cool to a predetermined temperature prior to attempting a take-off.

In that manner, if a take-off is aborted, the aircraft brakes may more safely accept the heat associated with a "rejected take-off" ("RTO"). An RTO refers generally to engagement of aircraft brakes during an aborted take-off. Typically, an RTO includes high braking loads over a short time period, which in turn correlates to a rapid increase in brake temperature. If aircraft brakes above the predetermined temperature are used in an RTO, brake malfunction may become more likely. Waiting a fixed period of time between landing and take-off tends to lead to wasted time, as the brakes may have cooled to the predetermined temperature prior to the end of the waiting period.

SUMMARY

Methods disclosed include estimating a cooling time of a brake assembly. The method includes a method of estimating a cooling time of a brake assembly, comprising, receiving, by a brake system control unit ("BSCU") comprising a processor and a tangible, non-transitory memory, a first temperature of the brake assembly at a first time, receiving, by the BSCU, a second temperature of the brake assembly at a second time, determining, by the BSCU, a temperature decay coefficient ("α") of the brake assembly using the first temperature and the second temperature, calculating, by the BSCU, an estimated total time to cool the brake assembly to a predetermined temperature based on α, the first temperature and the predetermined temperature.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
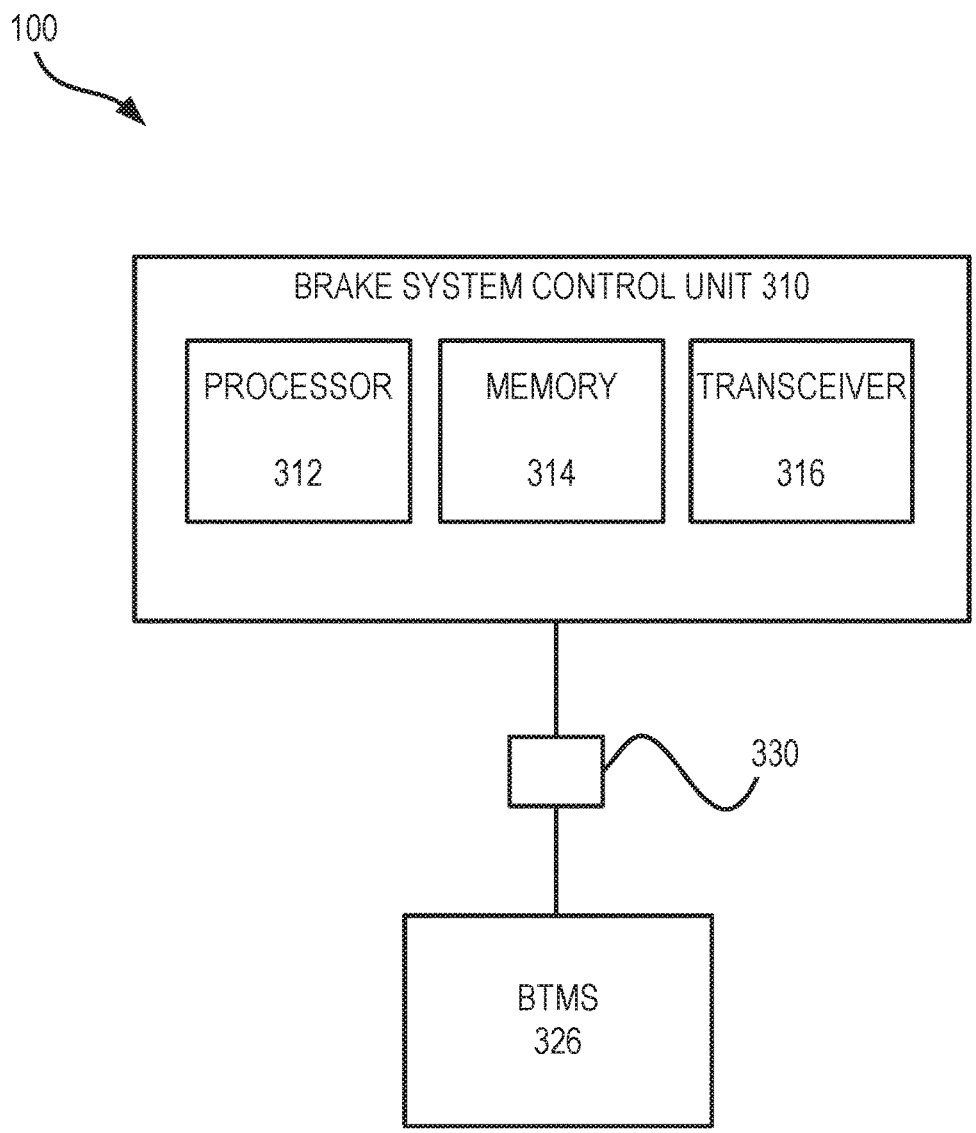
FIG. 1 illustrates a brake control unit, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, electrical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

After a landing or other braking event, it is important to determine how much time should elapse until the brakes are below a predetermined temperature to allow for a safe take-off. Waiting for too long a period tends to waste time, which is not acceptable in the time-sensitive aviation industry. Waiting for too short a period may compromise aviation safety.

The thermodynamics of a brake assembly (i.e., brake heat sink, pressure plate, and/or other components) are complex systems to model. Sophisticated models that incorporate many environmental variables and other data may be used with a high level of accuracy. However, such sophisticated models are associated with systems that are capable of providing a wide number of environmental variables and utilize significant processor and memory overhead. Such systems also tend to rely on a constant power supply during operation. Thus, power interruption may impair the ability of such a system to function. As disclosed in various embodiments, various systems and methods may be used to estimate a time for a brake to cool without using, for example, the ambient temperature. In this manner, various embodiments use low system overhead (e.g., small amounts of memory and/or processor time) and are robust enough to withstand intermittent power interruptions.

After a brake assembly has reached a peak temperature, calculating an estimated total time to cool may be simplified with the assumption that the cooling profile of the brake assembly mainly follows a convective process. Moreover, ambient air temperature may be excluded from calculations in various embodiments without (or with minimal) sacrificing accuracy. By excluding ambient air temperature, one need not have access to a sensor that provides ambient air temperature, nor the associated processor overhead for receiving ambient air temperature and processing the same. Instead, tuning parameters may be used to tune the time to cool estimation.

Temperature measurements of a brake assembly may be taken periodically. For example, time $t_n$ may be found using the number of measurements taken multiplied by the time of the period. Stated another way, $t_n = nT_{period}$ where n is the number of measurements (i.e., samples) taken and $T_{period}$ is the length of the period between each measurement (i.e., a length of a sampling period). For example, where 5 measurements have been taken (n=5) at one minute intervals ($T_{period}$=1 minute), time $t_n$ is 5 minutes. The sampling period is not particularly limited and, in various embodiments, may include periods of 5 minutes, 2 minutes, 1 minute, 45 seconds, 30 seconds, and 15 seconds.

In various embodiments, by using the ratio of the temperature of the brake assembly for two samples, α, a temperature decay coefficient greater than zero, may be determined and satisfy the equation $$\alpha[t_n] = \ln\left(\frac{T_{BTMS}(t_n) - T_{ADJ}}{T_{BTMS}(t_{n-1}) - T_{ADJ}}\right)$$

wherein $T_{BTMS}(t_n)$ is the temperature of the brake assembly at time $t_n$, $T_{BTMS}(t_{n-1})$ is the temperature of the brake assembly at time $t_{n-1}$, $T_{ADJ}$ is a tunable parameter. In various embodiments, $T_{ADJ}$ may be a value from 0 to just below the maximum safe brake assembly temperature (expressed below in various equations as BRAKEHOT). According to various embodiments, by receiving the brake assembly temperature to determine a peak temperature value, the initial time condition for estimating the total time to cool a brake assembly may be set to t=0.

Thus, tcool[n] may be found using the below equation:

$$t_{Cool}[n] = \frac{1}{\alpha[n]} \cdot \ln\left(\frac{BRAKEHOT - T_{ADJ}}{T_{BTMS}(t_{n-1}) - T_{ADJ}}\right) - T_{period}$$

In various embodiments, by using the ratio of the temperature of the brake assembly for two samples taken p number of samples apart, α, may be determined and satisfy the equation:

$$\alpha[t_n] = \frac{1}{p \cdot T_{period}} \cdot \ln\left(\frac{T_{BTMS}(t_n) - T_{ADJ}}{T_{BTMS}(t_{n-p}) - T_{ADJ}}\right)$$

Thus, consistent with the above, $t_{cool}[n]$ may be found using the below equation:

$$t_{Cool}[n] = \frac{1}{\alpha[n]} \cdot \ln\left(\frac{BRAKEHOT - T_{ADJ}}{T_{BTMS}(t_{n-p}) - T_{ADJ}}\right) - p \cdot T_{period}$$

In various embodiments, due to various factors (e.g., noise, rounding errors, etc.), the estimated total time to cool the brake assembly may be filtered with a low-pass filter to provide a smooth and/or continuous estimation. The particular type of low-pass filter is not particularly limited and can include any digital filter. For example, various low-pass filters can include first order low-pass filters, second order low-pass filters, third order low pass filters, etc. Furthermore, the low-pass filters can include smoothing parameters, such as a tuning parameter.

For example, in various embodiments, the low-pass filter may comprise the equation $$t_{Cool\_Filt}[i] = t_{Cool\_Filt}[i-1] + \beta \cdot (t_{Cool}[i] - t_{Cool\_Filt}[i-1])$$

wherein $t_{Cool\_Filt}[i]$ is the filtered estimated total time to cool the brake assembly to a predetermined temperature at time interval i, $t_{Cool\_Filt}[i-1]$ is the filtered estimated total time to cool the brake assembly to a predetermined temperature at a time interval preceding the time interval i, β is a smoothing constant and $t_{Cool}[i]$ is the unfiltered estimated total time to cool the brake assembly to a predetermined temperature at time interval i.

As described above, the estimated total time to cool is the period of time from the present time to the time when the brake assembly reaches the maximum safe brake assembly temperature (i.e., BRAKEHOT). In various embodiments, a brake system control unit ("BSCU") or other processor may filter the estimated total time to cool the brake assembly with a low-pass filter for each new period.

In various embodiments after the adjusted estimation is calculated, for example by a processor (e.g., a processor in a BSCU), various systems and methods include reporting the adjusted estimation with an output device. According to various embodiments, the output device may be in at least one of electrical communication and radio frequency ("RF") communication with the processor, for example, the processor of a BSCU. Without being limited to any theory, it is believed that in various embodiments, as the estimated temperature converges with the actual temperature of the brake assembly, the error in estimation is reduced, thus, providing a smoother and a more continuous estimation in output devices. Accordingly, because the error in estimation is reduced as the actual temperature approaches the predetermined temperature, minimum cooling time tolerance parameters may be eliminated.

As discussed above, a BSCU or other processor may perform various calculations described herein. A BSCU may be in communication with one or more brake pedals and downstream components that receive commands from the BSCU, either directly or indirectly, to effect and control braking. For example, in various embodiments, the BSCU may receive pedal commands, process the pedal commands, and then command electromechanical actuator controllers (EMACs) and electromechanical brake actuators (EBAs) or command a shutoff valve (SOV) and/or brake servo valves (BSV) in hydraulic brakes.

Referring to FIG. 1, a system 100 is illustrated according to various embodiments. System 100 may comprise BSCU 310. BSCU 310 may comprise a processor 312, a tangible, non-transitory memory 314, a transceiver 316, and may be communicatively connected to brake temperature monitoring system (BTMS) 326, for example through electrical connection 330. Tangible, non-transitory memory 314 may contain logic to allow processor 312 to estimate the cooling time of a brake assembly according to various embodiments.

In various embodiments, BSCU 310 may evaluate the below equation:

$$\alpha[t_n] = \ln\left(\frac{T_{BTMS}(t_n) - T_{ADJ}}{T_{BTMS}(t_{n-1}) - T_{ADJ}}\right)$$

Where $T_{ADJ}$ is a tunable parameter and may take a value from 0 to a value approaching but less than BRAKEHOT. In various embodiments, $T_{ADJ}$ may be 86 F or 120 F.

According to various embodiments, by BSCU 310 receiving the brake assembly temperature the time for the brake to cool may then be found by evaluating the equation:

$$t_{Cool}[n] = \frac{1}{\alpha[n]} \cdot \ln\left(\frac{BRAKEHOT - T_{ADJ}}{T_{BTMS}(t_{n-1}) - T_{ADJ}}\right) - T_{period}$$

BSCU 310 may thus receive brake temperature from BTMS 326, for example, continuously or in a random access fashion.

In various embodiments, the estimated time to cool the brake assembly may be filtered with a low-pass filter that may comprise the equation $$t_{Cool\_Filt}[i] = t_{Cool\_Filt}[i-1] + \beta \cdot (t_{Cool}[i] - t_{Cool\_Filt}[i-1])$$

wherein $t_{Cool\_Filt}[i]$ is the filtered estimated total time to cool the brake assembly to a predetermined temperature at time interval i, $t_{Cool\_Filt}[i-1]$ is the filtered estimated total time to cool the brake assembly to a predetermined temperature at a time interval preceding the time interval i, $\beta$ is a smoothing constant and $t_{Cool}[i]$ is the unfiltered estimated total time to cool the brake assembly to a predetermined temperature at time interval i.

Accordingly, in various embodiments, the estimated total time to cool may be adjusted by the equation using non consecutive temperature values p sample apart:

$$t_{Cool}[n] = \frac{1}{\alpha[n]} \cdot \ln\left(\frac{BRAKEHOT - T_{ADJ}}{T_{BTMS}(t_{n-p}) - T_{ADJ}}\right) - p \cdot T_{period}$$

wherein $t_{Cool}[n]$ is the adjusted estimated time to cool the brake assembly to a predetermined temperature at time interval n. Exemplary sampling periods according to various embodiments, may include periods of 5 minutes, 2 minutes, 1 minute, 45 seconds, 30 seconds, and 15 seconds.

In various embodiments, the estimated time to cool the brake assembly may be filtered with a low-pass filter that may comprise the equation $$t_{Cool\_Filt}[i] = t_{Cool\_Filt}[i-1] + \beta \cdot (t_{Cool}[i] - t_{Cool\_Filt}[i-1])$$

wherein $t_{Cool\_Filt}[i]$ is the filtered estimated total time to cool the brake assembly to a predetermined temperature at time interval i, $t_{Cool\_Filt}[i-1]$ is the filtered estimated total time to cool the brake assembly to a predetermined temperature at a time interval preceding the time interval i, $\beta$ is a smoothing constant and $t_{Cool}[i]$ is the unfiltered estimated total time to cool the brake assembly to a predetermined temperature at time interval i.

Figure 2:
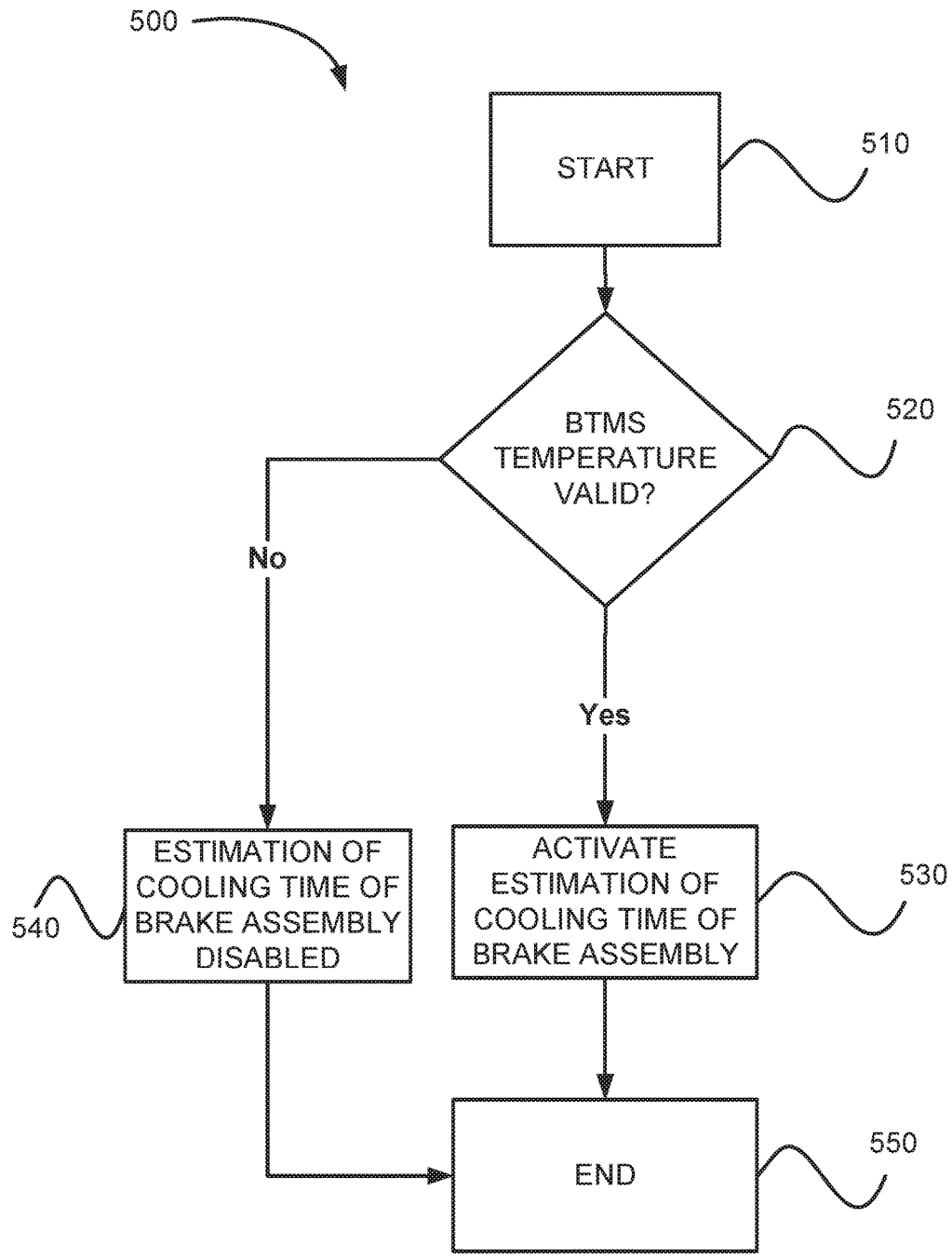
FIG. 2 illustrates a logical flowchart of activation of a system to estimate the time to cool a brake assembly in accordance with various embodiments.

Referring to FIG. 2, a logical flowchart of activation of a system to estimate the time to cool a brake assembly, according to various embodiments, is illustrated. According to various embodiments, activation method 500 may be used, for example, by a BSCU or other processor to control calculations relevant to the estimation of a time to cool a brake assembly. According to various embodiments, activation method 500 commences at step (step 510). A determination of whether the BTMS temperature reading is valid may be made (step 520). In that regard, the BTMS temperature reading may be considered valid if the BTMS temperature reading is within a range that is reasonable. If it is determined that the BTMS temperature reading is not valid, the estimation of cooling time of the brake assembly is disabled (step 540) and method 500 concludes (step 550). If it is determined that the BTMS temperature reading is valid, then the estimation of cooling time of the brake assembly is activated (step 530) and then the method may conclude (step 550). In various embodiments, activation method 500 may be repeated continuously. In various embodiments, activation method 500 may be repeated after a predetermined condition, such as the passing of a period of time, when power is supplied to the processor, after a braking event, and combinations thereof.

Figure 3:
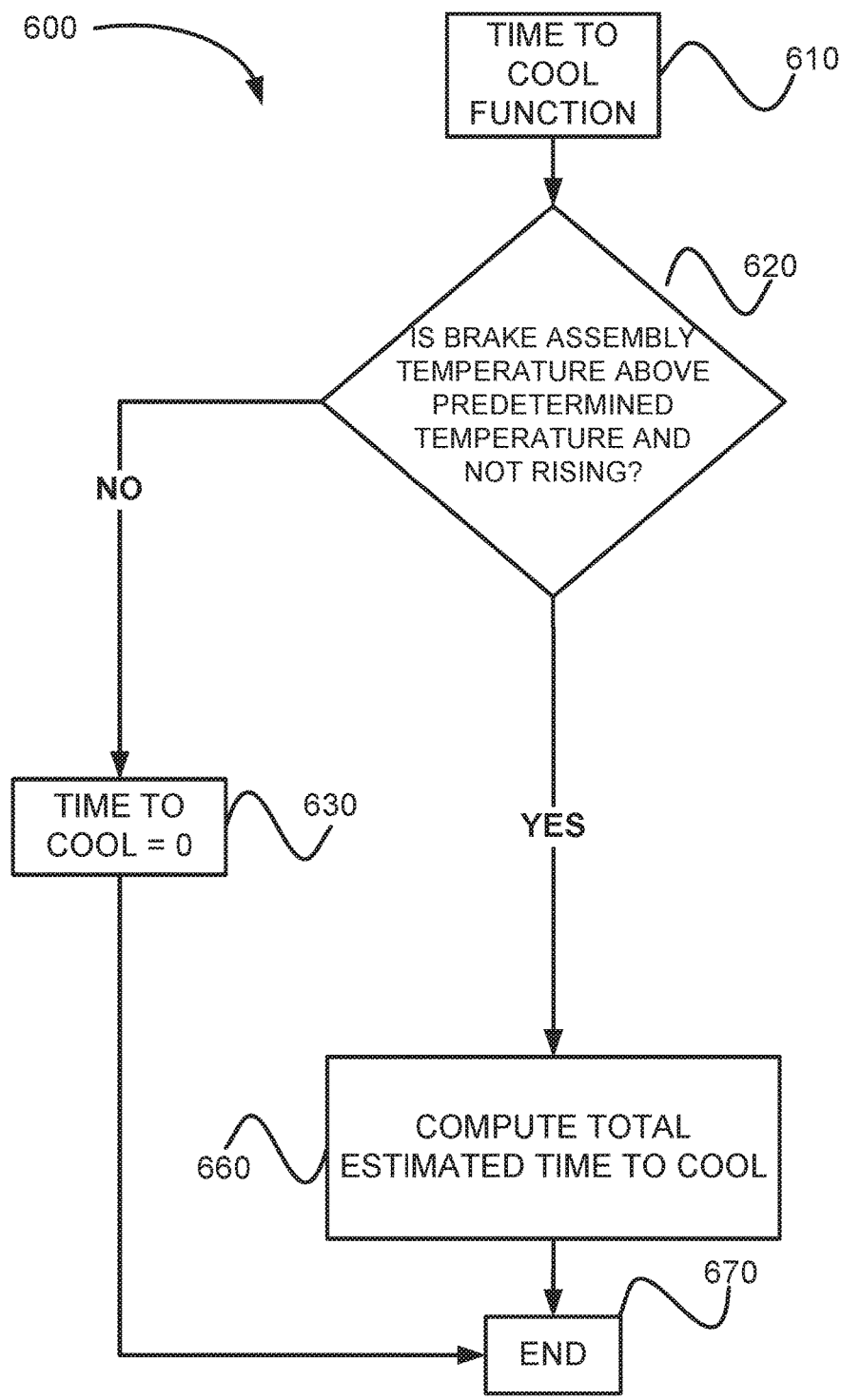
FIG. 3 illustrates a logical flow chart for an output of the estimated time to cool a brake assembly, in accordance with various embodiments.

With reference to FIG. 3, a logical flow chart for an output of the estimated time to cool a brake assembly, in accordance with various embodiments, is illustrated. Method 600 may comprise activating a time to cool function for a processor such as in a BSCU (step 610). In various embodiments, the processor may determine whether the brake assembly is above a predetermined temperature and not rising (step 620). As used herein, the term "predetermined temperature" may include maximum safe operating temperatures of braking systems for immediate dispatch, for example, the value BRAKEHOT discussed above. Moreover, the processor may determine if the brake assembly's temperature is rising. If the brake assembly is not above a predetermined temperature or rising, then the output for the time to cool may be set to zero (step 630) and the method may terminate (step 670). In various embodiments, when the brake assembly is not above a predetermined temperature, the indication that the brakes are cool can be indicated by a variety of methods, such as an via an indication light, via a display that may show symbols or words indicating that the brakes are sufficiently cool, etc.

According to various embodiments, when the brake assembly is above a predetermined temperature and not rising, the processor may compute the estimated time to cool (step 660). In various embodiments, the computing of the estimated time to cool may comprise determining a temperature decay coefficient ("α") of the brake assembly, and calculating an estimated total time to cool the brake assembly to a predetermined temperature.

In various embodiments, step 660 may comprise calculating, by the processor, an estimated total time to cool the brake assembly to a predetermined temperature based on two consecutive brake assembly temperature samples. As described above, two consecutive samples may be referred to a n and n−1 and α may be calculated using the equation discussed above:

$$\alpha[t_n] = \ln\left(\frac{T_{BTMS}(t_n) - T_{ADJ}}{T_{BTMS}(t_{n-1}) - T_{ADJ}}\right)$$

$$t_{Cool}[n] = \frac{1}{\alpha[n]} \cdot \ln\left(\frac{BRAKEHOT - T_{ADJ}}{T_{BTMS}(t_{n-1}) - T_{ADJ}}\right) - T_{period}$$

wherein $T_{BTMS}(t_n)$ is the temperature of the brake assembly at time $t_n$, $T_{BTMS}(t_{n-1})$ is the temperature of the brake assembly at time $t_{n-1}$, $T_{ADJ}$ is a tunable parameter.

In various embodiments, step 660 may comprise calculating, by the processor, an estimated total time to cool the brake assembly to a predetermined temperature based on two non-consecutive brake assembly temperature samples. As described above, two non-consecutive samples may be referred to as sample n and another sample spaced "p" apart (i.e., sample n−p) and α may be calculated using the equation discussed above:

$$\alpha[t_n] = \frac{1}{p \cdot T_{period}} \cdot \ln\left(\frac{T_{BTMS}(t_n) - T_{ADJ}}{T_{BTMS}(t_{n-p}) - T_{ADJ}}\right)$$

$$t_{Cool}[n] = \frac{1}{\alpha[n]} \cdot \ln\left(\frac{BRAKEHOT - T_{ADJ}}{T_{BTMS}(t_{n-p}) - T_{ADJ}}\right) - p \cdot T_{period}$$

wherein $T_{BTMS}(t_n)$ is the temperature of the brake assembly at time $t_n$, $T_{BTMS}(t_{n-p})$ is the temperature of the brake assembly at time $t_{n-p}$, $T_{ADJ}$ is a tunable parameter. If the value p is greater than 2, for example, the temperatures $T_{BTMS}(t_n)$ and $T_{BTMS}(t_{n-p})$ are non-consecutive In various embodiments, the estimated time to cool the brake assembly may be filtered with a low-pass filter that may comprise the equation $$t_{Cool\_Filt}[i] = t_{Cool\_Filt}[i-1] + \beta \cdot (t_{Cool}[i] - t_{Cool\_Filt}[i-1])$$

wherein $t_{Cool\_Filt[i]}$ is the filtered estimated total time to cool the brake assembly to a predetermined temperature at time interval i, $t_{Cool\_Filt}[i-1]$ is the filtered estimated total time to cool the brake assembly to a predetermined temperature at a time interval preceding the time interval i, $\beta$ is a smoothing constant and $t_{Cool}[i]$ is the unfiltered estimated total time to cool the brake assembly to a predetermined temperature at time interval i.

With temporary reference to FIGS. 2-3, according to various embodiments, methods 500, 600, and combinations thereof may be repeated to provide updated information on the estimated time to cool the brake assembly. In various embodiments, by repeating various disclosed methods, systems and methods for determining the cooling time for a brake assembly may adapt cooling profiles based on changing environmental conditions. For example, if a pilot takes off with the brakes excessively hot, disclosed systems and methods may inform the pilot how long he/she must fly with the gear extended before retraction.

In various embodiments, a hysteresis may be used with BTMS temperature data to prevent repeated and constant activation. Accordingly, in various embodiments, such as those where the cooling time is reported to an output device (e.g., to a control panel in the cockpit), the output device may be prevented from switching on and off repeatedly within a period of time.

Various disclosed systems and methods may be independent of whether the BSCU has been turned off after landing. Accordingly, algorithms may resume once power is restored to disclosed systems allowing for prediction of the time to cool the brake assembly with the new detected initial conditions upon re-power up. In various embodiments, this may allow for more user-friendly systems and methods.

Moreover, disclosed systems and methods according to various embodiments, may require reduced computation from on-board systems as compared to conventional methods, therefore making it easier to maintain memory and other computational equipment. Disclosed methods also reduce the number of tunable parameters when compared to conventional systems and methods.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. § 101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of estimating a cooling time of a brake assembly, comprising:

receiving, by a brake system control unit ("BSCU") comprising a processor and a tangible, non-transitory memory, a first temperature of the brake assembly at a first time;

receiving, by the BSCU, a second temperature of the brake assembly at a second time;

determining, by the BSCU, a temperature decay coefficient ("α") of the brake assembly based on the first temperature and the second temperature; and calculating, by the BSCU, an estimated total time to cool the brake assembly to a predetermined temperature based on α, the first temperature and the predetermined temperature, wherein α is greater than zero and satisfies an equation $$\alpha[t_n] = \frac{1}{p \cdot T_{period}} \cdot \ln\left(\frac{T_{BTMS}(t_n) - T_{ADJ}}{T_{BTMS}(t_{n-p}) - T_{ADJ}}\right)$$

wherein $T_{BTMS}(t_n)$ is a temperature of the brake assembly at the second time ("$t_n$"), $T_{BTMS}(t_{n-p})$ is a temperature of the brake assembly at the first time ("$t_{n-p}$"), $T_{period}$ is a length of a sampling period, p is a number of samples taken since the first time, and $T_{ADJ}$ is a tuning parameter.

2. The method according to claim 1, further comprising determining, by the BSCU, whether a temperature reported by a brake temperature monitoring system is within a pre-determined range.

3. The method according to claim 1, wherein the calculating of the estimated total time to cool the brake assembly to the predetermined temperature comprises an equation $$t_{Cool}[n] = \frac{1}{\alpha[n]} \cdot \ln\left(\frac{BRAKEHOT - T_{ADJ}}{T_{BTMS}(t_{n-p}) - T_{ADJ}}\right) - p \cdot T_{period}$$

wherein $t_{Cool}[n]$ is the estimated total time to cool the brake assembly to the predetermined temperature BRAKEHOT at time interval n.

4. The method according to claim 3, further comprising adjusting the estimated total time to cool the brake assembly.

5. The method according to claim 4, wherein the adjusting comprises filtering the estimated total time to cool the brake assembly with a low-pass filter.

6. The method according to claim 5, wherein the filtering of the estimated total time to cool the brake assembly with the low-pass filter comprises an equation $$t_{Cool\_Filt}[i] = t_{Cool\_Filt}[i-1] + \beta \cdot (t_{Cool}[i] - t_{Cool\_Filt}[i-1])$$

wherein $t_{Cool\_Filt}[i]$ is the filtered estimated total time to cool the brake assembly to a predetermined temperature at time interval i, $t_{Cool\_Filt}[i-1]$ is the filtered estimated total time to cool the brake assembly to a predetermined temperature at a time interval preceding the time interval i, β0 is a smoothing constant and $t_{Cool}[i]$ is the unfiltered estimated total time to cool the brake assembly to a predetermined temperature at time interval i.

7. The method according to claim 1, further comprising sending, by the BCSU, the estimated total time to cool to an output device in at least one of electrical communication and radio frequency ("RF") communication with the BCSU.

* * * * *

UNITED STATES PATENT AND TRADEMARK OFFICE
CERTIFICATE OF CORRECTION

PATENT NO. : 10,124,782 B2
APPLICATION NO. : 15/651700
DATED : November 13, 2018
INVENTOR(S) : Marc Jean Claude Georgin et al.

Page 1 of 1

It is certified that error appears in the above-identified patent and that said Letters Patent is hereby corrected as shown below:

In the Claims

In Column 10, Line 17 please delete "β0" and insert therefore -- β --

Signed and Sealed this
Twenty-ninth Day of January, 2019

Andrei Iancu
*Director of the United States Patent and Trademark Office*